W. H. BARLING.
SPAR.
APPLICATION FILED FEB. 17, 1921.
1,405,889.
Patented Feb. 7, 1922.
2 SHEETS—SHEET 1.
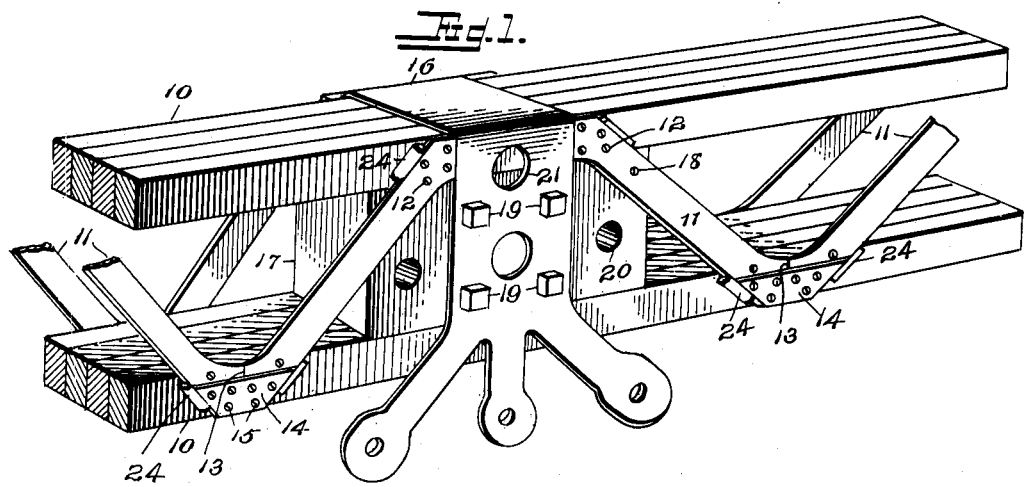
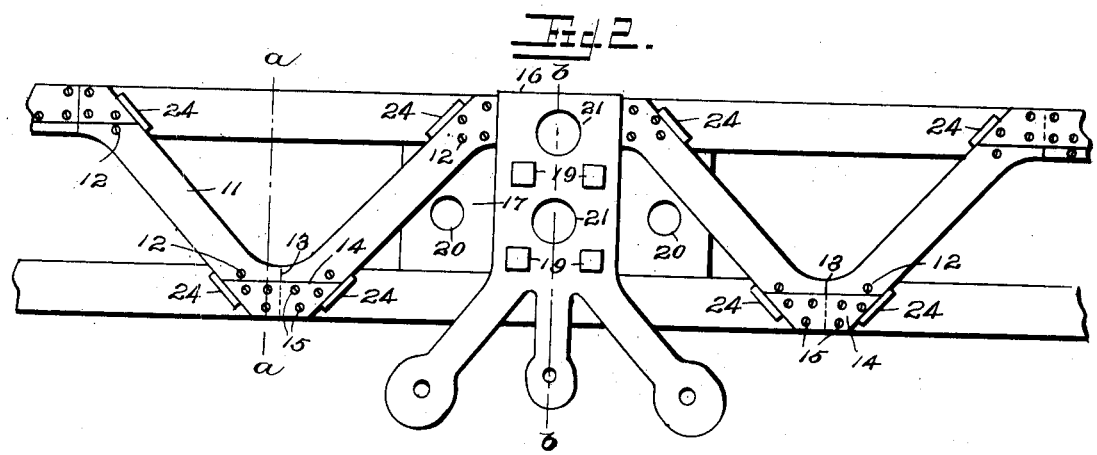
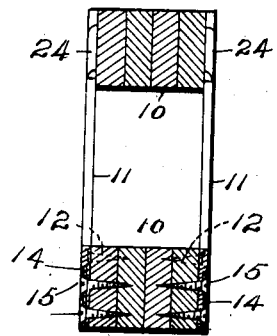
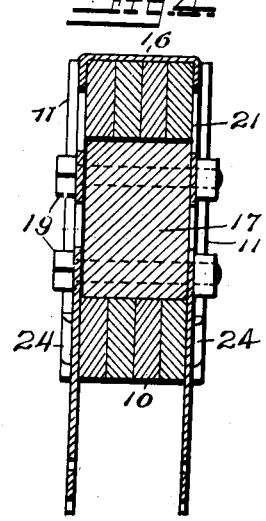
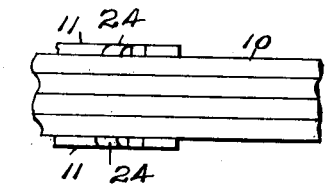
Inventor
Walter H. Barling
Robert H. Young
Attorney

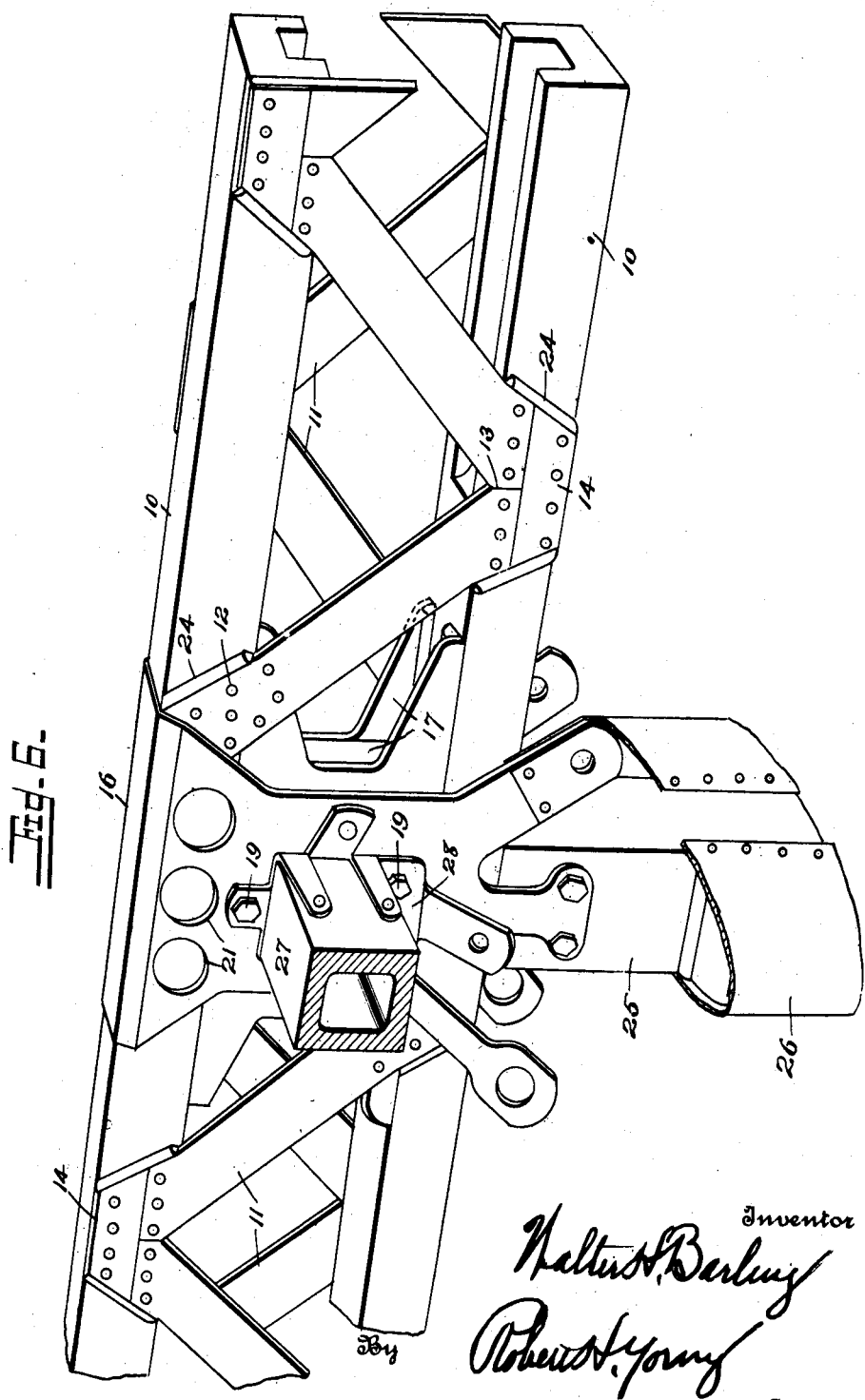

UNITED STATES PATENT OFFICE.

WALTER HENRY BARLING, OF HASBROUCK HEIGHTS, NEW JERSEY.

SPAR.

1,405,889.  Specification of Letters Patent.  Patented Feb. 7, 1922.

Application filed February 17, 1921. Serial No. 445,844.

*To all whom it may concern:*

Be it known that I, WALTER HENRY BARLING, a citizen of England, residing at Hasbrouck Heights, in the county of Bergen and State of New Jersey, have invented certain new and useful Improvements in Spars, of which the following is a specification.

This invention relates to spars or frame members for aircraft in general, the broad object in view being to produce a spar or frame member of particularly light and strong construction, such spar being adapted for use in the frame work of any part of an aircraft and being particularly designed for use as a wing spar or as a fuselage longéron.

Another object of the invention is to produce a spar or frame member for aircraft which may be manufactured with rapidity and with precision in order that it may accurately fit into place and be adapted to receive or have connected therewith or thereto the other adjacent members of the frame, such for example as the interplane struts, stays, outriggers, etc.

With the above and other objects in view the invention consists in the novel construction, combination and arrangement herein fully described, illustrated and claimed.

In the accompanying drawings:

Fig. 1 is a fragmentary perspective view of the improved spar or frame member, showing one of the clips thereon;

Fig. 2 is a side elevation of a portion of the spar;

Fig. 3 is a cross-section through the same on the line *a—a* of Fig. 2;

Fig. 4 is a cross-section through the spar on the line *b—b* of Fig. 2;

Fig. 5 is a fragmentary top plan view of the spar;

Fig. 6 is a perspective view of the spar showing certain modifications.

The improved spar or frame member comprises in the illustrated embodiment thereof two main body members 10. While I have shown only two of such main body members, it will of course be obvious that more than two of such members may be employed when required. Each of the body members 10 is shown as of a laminated formation, any desired number of lamination of plies being used. It is obvious also that the body members 10 may be made each in one piece, preferably of straight or edge grain lumber although any other material found suitable may be employed.

The main body members 10 are arranged in spaced and substantially parallel relation to each other. It is not essential that the body members 10 be exactly parallel to each other and, in fact, it is usual in the construction of spars or frame members such as the longérons and wing spars of aircraft, to make said spars tapering or larger at one end than at the other. The body members 10, however, extend in the same general direction. Said body members are interconnected at intervals by means of truss members 11 which are alternately inclined in reverse directions as shown in the drawings. The truss members 11 are terminally fastened to the side edges of the main body members 10 by means of glue and by additional means such as screws 12 or the equivalent thereof. In fact any suitable fastening means may be employed for securing the end portions of the truss members 11 to the main body members 10. Truss members 11 are preferably employed at both sides of the body members 10 thus providing a strong and light spar or frame member. Adjacent truss members 11 meet in a butt joint 13 and such joint is reinforced by a splicing clamp 14 which is inset flush into the outer faces of the abutting ends of adjacent truss members 11 and preferably glued in place and also additionally fastened by means of screws 15 or the equivalent thereof, said additional fastening elements preferably passing through the truss members 11 and well into the main body members 10.

A clip or fitting 16, usually of metal, is fitted over the spar, closely embracing the main body members 10 and also embracing or lying in contact with the opposite faces of a strut block 17 the latter being interposed between the main body members 10 and being of greater length than the width of the clip 16 in order that the adjacent truss members 11 may have portions thereof resting against said strut block 17. The portions of the truss members 11 which bear against the strut block 17 may be glued thereto and also secured thereto by additional fastening means, such as screws 18. As shown in the drawings, the truss members 11 which are contiguous to clip 16 bears at their extremities against the opposite side edges of said clip. Therefore the clip 16 need be only wide enough to embrace the body members 10 and the strut block 17 the latter being of the same thickness as the width of the body members 10. This enables a lighter weight clip to be employed as it is not necessary for the same to embrace the truss members 11. The clip 16 is fastened to the spar or frame member as a whole by means of bolts 19 or the equivalent thereof, said bolts passing through the strut block 17 and not piercing the main body members 10 which are thus left of full or unimpaired strength. The strut block is shown as provided with weight reducing openings 20 and the clip 16 is likewise made lighter by providing the same with openings 21. The clip is shown as embodying a plurality of arms 22 extending therefrom and formed with holes 23 to adapt bracing members such as stays and struts to be attached thereto.

In order to still further strengthen and brace the structure, stops 24 are secured to the main body members 10 preferably by means of glue and are fastened preferably in the same way to the adjacent edges of the truss members 11. Ordinarily the stops 24 which form abutment shoulders for the truss members 11 are of quarter round formation in cross-section and are fitted into the angle between the main body members 11 and the main body members 10.

Ordinarily the main body members 10 are formed, as above indicated, of wood, while the truss members 11 are formed preferably of plywood, as are also the splicing clamps 14. The stop blocks 24 are also ordinarily formed of wood. It will be obvious, however, that any material found adequate or desirable for the purpose may be employed in the formation of the several elements of the spar or frame member. Ordinarily the strut block 17 will also be formed of wood, preferably of light weight. The truss members are ordinarily glued and screwed to the main body members but they may be riveted, bolted or otherwise fastened thereto. The metal clips are reduced in size and weight by having to encircle only the effective main body members. The splicing clamps are let into the abutting ends of the truss members so as to lie flush with the outer surfaces thereof and hence do not interfere with the application of the ribs of an aerofoil to the spars. Should a truss member be defectively fastened to the adjacent main body member the splicing clamps and stops would still hold such truss member in place without materially impairing the strength of the spar or frame member. In some cases the strut block may be omitted and the clip fastened directly to the main body members. The construction above described may be used for a built up strut having two main body members as illustrated in the accompanying drawings. The construction may likewise be used for any frame piece or member which is subjected to bending moments or which requires great stiffness combined with light weight.

As shown in Fig. 6 the truss members 11 on one side of the spar are inclined reversely to the corresponding truss members on the opposite side thus serving to support and brace the members 10 at double the number of intervals as compared with Fig. 1. The block 17 in Fig. 6 is shown as made in three pieces, the outer pieces being longer than the center pieces, thus making said block, as a whole, lighter in weight and less liable to split under shrinkage. Adjacent truss members may meet in a butt or scarf joint or half lap joints as preferred.

In Fig. 6 a fragment of one of the struts 25 is shown fastened to the spar by bolts and screws through an extension lug at the bottom of the fitting 16, the strut being streamlined by fairing 26. 27 represents a cross strut between spars to one of which it is shown as secured by means of a socket clip 28 held by the bolts 19.

I claim:

1. An aircraft spar embodying main body members in spaced relation to each other and extending in the same general direction, strut members between said body members and inclined truss members terminally fastened to the side edges of said main body members and said strut members.

2. An aircraft spar embodying main body members in spaced relation to each other and extending in the same general direction, and inclined truss members arranged at opposite sides of and terminally fastened to the side edges of said main body members, said body members having inclined abutment shoulders for the truss members.

3. An aircraft spar embodying main body members in spaced relation to each other and extending in the same general direction, and inclined truss members terminally fastened to the side edges of said main body members, said body members having on the side edges thereof inclined abutment shoulders against which the truss members are braced.

4. An aircraft spar embodying main body members in spaced relation to each other and extending in the same general direction, inclined truss members terminally fastened to the side edges of said main body members and strut blocks interposed between the main body members and having adjacent truss members fastened thereto.

5. An aircraft spar embodying main body members in spaced relation to each other and extending in the same general direction, a clip embracing said body members, and inclined truss members terminally fastened to the side edges of said main body members lying at opposite sides of said clip.

6. An aircraft spar embodying main body members in spaced relation to each other and extending in the same general direction, a strut block interposed between the main body members, a clip embracing said block and main body members, and inclined truss members terminally fastened to the side edges of said main body members lying at opposite sides of said clip.

7. An aircraft spar embodying main body members in spaced relation to each other and extending in the same general direction, inclined truss members terminally fastened to the side edges of said main body members, and splicing clamps for fastening adjacent ends of truss members to the main body members, said splicing clamps being inset flush with the outer faces of the truss members.

In testimony whereof I have affixed my signature.

WALTER HENRY BARLING.